(12) United States Patent
Chen et al.

(10) Patent No.: US 7,389,277 B2
(45) Date of Patent: Jun. 17, 2008

(54) MACHINE LEARNING SYSTEMS AND METHODS

(75) Inventors: Hung-Han Chen, Watertown, MA (US); Lawrence Hunter, Denver, CO (US); Harry Towsley Poteat, Boston, MA (US); Kristin Kendall Snow, Somerville, MA (US)

(73) Assignee: Medical Scientists, Inc., Irvine, CA (US)

( * ) Notice: Subject to any disclaimer, the term of this patent is extended or adjusted under 35 U.S.C. 154(b) by 252 days.

(21) Appl. No.: 11/177,200

(22) Filed: Jul. 8, 2005

(65) Prior Publication Data
US 2005/0267850 A1    Dec. 1, 2005

Related U.S. Application Data

(63) Continuation of application No. 09/882,502, filed on Jun. 15, 2001, now Pat. No. 6,917,926.

(51) Int. Cl.
G06E 1/00 (2006.01)
G06E 3/00 (2006.01)
G06F 15/18 (2006.01)
G06G 7/00 (2006.01)

(52) U.S. Cl. ........................................................ 706/21
(58) Field of Classification Search ................. 706/12, 706/21, 15–16
See application file for complete search history.

(56) References Cited

U.S. PATENT DOCUMENTS 4,754,410 A    6/1988    Leech et al.

(Continued)

FOREIGN PATENT DOCUMENTS

WO    WO 97/44741    11/1997

OTHER PUBLICATIONS

Driver's drowsiness estimation by combining EEG signal analysis and ICA-based fuzzy neural networks Chin-Teng Lin; Sheng-Fu Liang; Yu-Chieh Chen; Yung-Chi Hsu; Li-Wei Ko; Circuits and Systems, 2006. ISCAS 2006. Proceedings. 2006 IEEE International Symposium on May 21-24, 2006 p. 4 pp. Digital Object Identifier 10.1109/ISCAS.2006.1693037.*

(Continued)

*Primary Examiner*—Michael B. Holmes
(74) *Attorney, Agent, or Firm*—Knobbe, Martens, Olson & Bear, LLP

(57) ABSTRACT

A method for using machine learning to solve problems having either a "positive" result (the event occurred) or a "negative" result (the event did not occur), in which the probability of a positive result is very low and the consequences of the positive result are significant. Training data is obtained and a subset of that data is distilled for application to a machine learning system. The training data includes some records corresponding to the positive result, some nearest neighbors from the records corresponding to the negative result, and some other records corresponding to the negative result. The machine learning system uses a co-evolution approach to obtain a rule set for predicting results after a number of cycles. The machine system uses a fitness function derived for use with the type of problem, such as a fitness function based on the sensitivity and positive predictive value of the rules. The rules are validated using the entire set of training data.

17 Claims, 9 Drawing Sheets

U.S. PATENT DOCUMENTS

| | | | |
|---|---|---|---|
| 5,535,301 | A | 7/1996 | Wolpert |
| 5,769,074 | A | 6/1998 | Barnhill et al. |
| 5,799,101 | A | 8/1998 | Lee et al. |
| 5,832,467 | A | 11/1998 | Wavish |
| 5,853,005 | A * | 12/1998 | Scanlon ............. 600/459 |
| 5,855,011 | A | 12/1998 | Tatsuoka |
| 5,862,304 | A * | 1/1999 | Ravdin et al. ............. 706/21 |
| 6,088,606 | A * | 7/2000 | Ignotz et al. ............. 600/316 |
| 6,149,636 | A * | 11/2000 | Roe et al. ............. 604/361 |
| 6,230,151 | B1 * | 5/2001 | Agrawal et al. ............. 706/12 |
| 6,248,063 | B1 | 6/2001 | Barnhill et al. |
| 6,260,033 | B1 | 7/2001 | Tatsuoka |
| 6,301,571 | B1 | 10/2001 | Tatsuoka |
| 6,306,087 | B1 | 10/2001 | Barnhill et al. |
| 6,342,037 | B1 * | 1/2002 | Roe et al. ............. 600/306 |
| 6,353,814 | B1 | 3/2002 | Weng |
| 6,372,951 | B1 * | 4/2002 | Ter-Ovanesyan et al. .... 604/361 |
| 6,399,853 | B1 * | 6/2002 | Roe et al. ............. 604/362 |
| 6,407,308 | B1 * | 6/2002 | Roe et al. ............. 604/361 |
| 6,409,684 | B1 * | 6/2002 | Wilk ............. 600/586 |
| 6,433,244 | B1 * | 8/2002 | Roe et al. ............. 604/361 |
| 6,436,055 | B1 * | 8/2002 | Roe ............. 600/584 |
| 6,479,727 | B1 * | 11/2002 | Roe ............. 604/361 |
| 6,519,580 | B1 | 2/2003 | Johnson et al. |
| 6,523,017 | B1 | 2/2003 | Lewis et al. |
| 6,570,053 | B2 * | 5/2003 | Roe et al. ............. 604/361 |
| 6,668,248 | B1 | 12/2003 | Lewis et al. |
| 6,713,660 | B1 * | 3/2004 | Roe et al. ............. 604/361 |
| 6,728,689 | B1 | 4/2004 | Drissi et al. |
| 6,732,083 | B2 * | 5/2004 | Bax ............. 706/12 |
| 6,754,655 | B1 * | 6/2004 | Segal ............. 707/6 |
| 6,917,926 | B2 | 7/2005 | Chen et al. |
| 6,968,327 | B1 * | 11/2005 | Kates et al. ............. 706/21 |
| 7,001,359 | B2 * | 2/2006 | Rogers ............. 604/118 |
| 2002/0184169 | A1 | 12/2002 | Optiz |
| 2002/0194148 | A1 | 12/2002 | Billet et al. |

OTHER PUBLICATIONS

A fuzzy classifier approach to assessing the progression of adolescent idiopathic scoliosis from radiographic indicators Ajemba, P.O.; Ramirez, L.; Durdle, N.G.; Hill, D.L.; Raso, V.J.; Electrical and Computer Engineering, 2004. Canadian Conference on vol. 3, May 2-5, 2004 pp. 1467-1470 vol. 3.*

A medical service requirements model for health system design Smallwood, R.D.; Murray, G.R.; Silva, D.D.; Sondik, E.J.; Klainer, L.M.; Proceedings of the IEEE vol. 57, Issue 11, Nov. 1969 pp. 1880-1887.*

Nakashima et al., "GA-Based Approaches for Finding the Minimum Reference Set for Nearest Neighbor Classification," 1998 IEEE International Conference on Evolutionary Computation, May 1998.

Chen, "A Notion for Machine Learning: Knowledge Developability," Proceedings of the 21st Annual Hawaii International Conference on System Sciences, vol. 3, pp. 274-279, Jan. 1988.

Kovalerchuk et al., "Comparison of Relational Methods and Attribute-Based Methods for Data Mining in Intelligent Systems," Proceedings of the 1999 IEEE International Symposium on Intelligent Control/Intelligent Systems and Semiotics, Sep. 1999.

Guan et al., "Protein Structure Prediction Using Hybrid AI Methods," Proceedings of the 10th Conference on Artificial Intelligence for Applications, Mar. 1994, pp. 471-473.

Michel et al., "Tree-Structured Nonlinear Signal Modeling and Prediction," IEEE Transactions on Signal Processing, Nov. 1999, vol. 47, No. 11.

Gregor et al., "Hybrid Pattern Recognition Using Markov Networks," IEEE Transactions on Pattern Analysis and Machine Intelligence, Jun. 1993, vol. 15, No. 6.

Salzberg et al., "Best-Case Results for Nearest-Neighbor Learning," IEEE Transactions on Pattern Analysis and Machine Intelligence, Jun. 1995, vol. 17, No. 6.

Guvenir et al., "A Supervised Machine Learning Algorithm for Arrhythmia Analysis," Computers in Cardiology, Sep. 1997, pp. 433-436.

Ratsaby, "Incremental Learning with Sample Queries," IEEE Transactions on Pattern Analysis and Machine Intelligence, Aug. 1998, vol. 20, No. 8.

Ricci et al., "Data Compression and Local Metrics for Nearest Neighbor Classification," IEEE Transactions on Pattern Analysis and Machine Intelligence, Apr. 1999, vol. 21, No. 4.

Lee, "An Information Theoretic Similarity-Based Learning Method for Databases", Proceedings of the 10th Conference on Artificial Intelligence for Applications, Mar. 1994, pp. 99-105.

Cercone, N., et al., "Rule-Induction and Case-Based Reasoning: Hybrid Architectures Appear Advantageous" *IEEE Transactions on Knowledge and Data Engineering*, vol. 11(1) pp. 166-174 (1999).

Harris, et al., "Class X: A Browsing Tool For Protein Sequence Megaclassifications" *Proceedings of the 26th Hawaii International Conference on System Science*, vol. 1, pp. 554-563 (1993).

Hunter, et al., "Applying Bayesian Classification to Protein Structure" *IEEE Expert*, vol. 7(4), pp. 67-75 (1991).

Hunter, "Knowledge Acquisition Planning for Interference From Large Databases" *Proceedings of the 23rd Annual Hawaii International Conference on Artificial Intelligence for Applications*, vol. 2, pp. 35-44 (1990).

Hunter, et al., "Bayesian Classification of Protein Structural Elements" *Proceedings of the 24th Annual Hawaii International Conference on System Sciences*, vol. 1, pp. 595-604 (1991).

Hunter, et al., Bayesian Classification of Protein Structure *IEEE Report*, vol. 7(4), pp. 67-75 (1992).

Junkar, et al., "Grinding Process Control Through Monitoring and Machine Learning" *3rd International Conference on Factory 2000, Competitive Performance Through Advanced Technology*, pp. 77-80 (1992).

Linkens, et al., "Machine-Learning Rule-based Fuzzy Logic Control for Depth of Anaesthesia" *1994 International Conference on Control*, vol. 1, pp. 31-36 (1994).

Hunter, "Coevolution Learning: Synergistic Evolution of Learning Agents and Problems Representations" *Proceedings of 1996 Multistrategy Learning Conference*, pp. 85-94 (1996).

Abramson, M.Z., et al., "Classification Using Cultural Co-evolution and Genetic Programming" *Proceedings of the First Annual Conference*, pp. 249-254 (1996).

Robnik-Sikonja, M., et al., "An Adaptation of Relief for Attribute Estimation in Regression" *Machine Learning: Proceedings of the Fourteenth International Conference*, pp. 296-304 (1997).

* cited by examiner

Figure 2

| FEATURE | VALUE | |
|---|---|---|
| AGE | ___ | 220 |
| AGEX | ___ | 221 |
| AMTPAIDYR1 | ___ | 222 |
| AMTPAIDYR2 | ___ | 223 |
| ANTENSCREEN | ___ | 224 |
| ANTENSCREENB | ___ | 225 |
| ANTEPARTUM | ___ | 226 |
| ANTEPARTUMB | ___ | 227 |
| BIRTHTYPE | ___ | 228 |
| BLACK | ___ | 229 |
| CCOMPLEX | ___ | 230 |
| COST20MN | ___ | 231 |
| COST20N | ___ | 232 |
| CPT5900 | ___ | 233 |
| CPT5900B | ___ | 234 |
| CPT5942X | ___ | 235 |
| CPT5942XB | ___ | 236 |
| DELIVERYTYPE | ___ | 237 |
| FERDRUG | ___ | 238 |
| HISPANIC | ___ | 239 |
| HRPVISITS | ___ | 240 |
| HRPVISITSX | ___ | 241 |
| HRPVISITSB | ___ | 242 |
| INCOME | ___ | 243 |
| MCOMP | ___ | 244 |
| MCOMPLEX | ___ | 245 |
| MCOMPLEX1 | ___ | 246 |
| MCOMPLEX2 | ___ | 247 |
| MCOMPUNI | ___ | 249 |
| NPVISITSX | ___ | 250 |
| NPVISITSXB | ___ | 251 |
| PMANAGE | ___ | 252 |
| PMANAGEB | ___ | 253 |
| WHITE | ___ | 254 |
| ZIP | ___ | 255 |
| ZIPX | ___ | 256 |

|  | Outcome | |
|---|---|---|
|  | Pos. | Neg. |
| Prediction Pos. | 320 | 322 |
| Prediction Neg. | 324 | 326 |

Simulation 20

515a  Rule 1:
  520a  FEATURE-256601 > −0.257896
  525a  → class T    530a    [72.5%]

515b  Rule 2:
  520b  FEATURE-256601 ≤ −0.257896
  525b  → class NIL    530b    [89.2%]

Default class: NIL

540    FEATURE-256601:

(+ −7/5 (* −17 (/ % MCOMP  24))
(* −31/100 (− FERDRUG  MCOMPUNI))
(* −9/500 (− (TAN  NPVISX) (* AGEX  MCOMP)))
(* 1/156250 ANTENSCR) (* 1/156250 ZIP)
(* 11/500000 (+ AGEX  ANTEPART) (TAN  INCOME))
(* 59/10000 AGEX) (* 59/10000 ANTEPART)
(* 49/5000 (SQR (− MCOMP  FERDRUG)))
(* 1/100 (TAN  NPVISX)))

Figure 7

Simulation #    720  720  720

Definition:     ___  ___  ___    722

Number of:
Positive cases  ___  ___  ___    724
Negative cases  ___  ___  ___    726
Negative controls ___  ___  ___  728

Control Selection ___  ___  ___  730

Input Features:

_____  ___  ___  ___
_____  ___  ___  ___
_____  ___  ___  ___    732
_____  ___  ___  ___
_____  ___  ___  ___

Simulation Output:                734
Number of rules    ___  ___  ___    736
Model Complexity   ___  ___  ___    738

Test Model Accuracy:              740
Sensitivity        ___  ___  ___
Specificity        ___  ___  ___
Pos. Predic. Value ___  ___  ___
Neg. Predic. Value ___  ___  ___

Validation Model Accuracy:        750
Sensitivity        ___  ___  ___
Specificity        ___  ___  ___
Pos. Predic. Value ___  ___  ___
Neg. Predic. Value ___  ___  ___

710

MACHINE LEARNING SYSTEMS AND METHODS

CROSS-REFERENCE TO RELATED APPLICATION

The present application is a continuation of and claims priority benefit under 35 U.S.C. § 120 from U.S. patent application Ser. No. 09/882,502, filed Jun. 15, 2001, entitled "MACHINE LEARNING METHOD," now U.S. Pat. No. 6,917,926, issued Jul. 12, 2005, which is hereby incorporated herein by reference in its entirety.

BACKGROUND OF THE INVENTION

1. Field of the Invention

This invention relates to the use of machine learning to predict outcomes and to the validation of such predictions.

2. Description of the Related Art

Machine learning techniques are used to build a model or rule set to predict a result based on the values of a number of features. The machine learning involves use of a data set that typically includes, for each record, a value for each of a set of features, and a result. From this data set, a model or rule set for predicting the result is developed.

These machine learning techniques generally build on statistical underpinnings. Statistical approaches test a proposed model against a set of data. Machine learning techniques search through a space of possible models, to find the best model to fit a given set of data.

Many existing machine learning systems use one type of machine learning strategy to solve a variety of types of problems. At least one system exists that uses a combination of machine learning strategies to derive a prediction method for solving a problem. As described in International Patent application number WO97/44741, entitled "System and Method for Combining Multiple Learning Agents to Produce a Prediction Method," published Nov. 27, 1997, and claiming priority from U.S. Ser. No. 60/018,191, filed May 23, 1996, an article entitled "Coevolution Learning: Synergistic Evolution of Learning Agents and Problem Representations, Proceedings of 1996 Multistrategy Learning Conference," by Lawrence Hunter, pp. 85-94, Menlo Park, Calif.: AAAI Press, 1996 and an article entitled "Classification using Cultural Co-evolution and Genetic Programming Genetic Programming: Proc. of the First Annual Conference," by Myriam Z, Abramson and Lawrence Hunter, pp. 249-254, The MIT Press, 1996 multiple learning strategies can be used to improve the ability of any one of those learning strategies to solve the problem of interest. A system incorporating some of these teachings is available as CoEv from the Public Health Service of the National Institutes of Health (NIH). The foregoing patent application and articles are incorporated herein by reference.

In a "co-evolution" system such as described above, an initial set of learning agents or learners is created, possibly using more than one machine learning strategy or method. Examples of machine learning methods include the use of genetic algorithms, neural networks, and decision trees. Each of the learning agents is then trained on a set of training data, which provides values from a set of features, and provides predictions for a rule for solving the problem. The predictions are then evaluated against a fitness function using RELIEF, which may be based on the overall accuracy of the results and/or the time required to obtain those results.

A set of results is obtained and the feature combinations used by the learning agents are extracted. The data is then transformed to reflect these combinations, thereby creating new features that are combinations of the pre-existing features.

In addition, a new generation of learning agents is created. Parameter values from the learning agents are copied and varied for the new generation, using (for example) a genetic algorithm approach.

Then, the process is repeated, with the new learning agents and representations of features, until sufficiently satisfactory results are obtained, or a set number of cycles or a set amount of time has been completed.

This system can provide improved results over systems using a single machine learning method. However, it still has significant limitations when attempting to apply it to real-world problems. For example, a fitness function based on overall accuracy is not suitable for all problems. Moreover, the method and the results are not easily used with many problems.

SUMMARY OF THE INVENTION

According to the present invention, machine learning is used to solve a problem by enhancing a machine learning system such as the co-evolution system described in the Background section, with improvements including a new fitness function, enhancements to the selection of the data, and a procedure to validate the solution obtained. In different embodiments, these improvements are used individually and in different combinations.

A control or training set of data is obtained from a data set and, if appropriate, potentially pertinent information is distilled from the data records. In one aspect of the invention, the control set is obtained by selecting the records for the less likely outcome and a portion of the records from the more likely outcome. The records from the more likely outcome, with this aspect of the invention, include some records for the "nearest neighbors" to the less likely outcome (as calculated by any of various similarity functions) and some records from among those in the more likely outcome that are not nearest neighbors to the less likely outcome. The data is applied to a machine learning system.

In another aspect of the invention, the machine learning system uses a fitness function that may be defined and/or varied by a user of the system and is based on a combination of predictive parameters other than accuracy. For example, the fitness function may be based on the sensitivity of the rules obtained, the positive predictive value of the rules, or a combination of these parameters. More generally, the fitness function may be based on various ratios and combinations of the number of true positives, the number of true negatives, the number of false positives, and the number of false negatives obtained by the system.

After obtaining one or more sets of rules, the rule sets can be validated, using the entire data set. In validating the rule sets, various outcome measures are obtained for the predicted results versus the actual results.

The resulting method is particularly appropriate when attempting to predict medical outcomes, although it is applicable at least to other problems in which the outcome being predicted is relatively unlikely. The resulting method also is particularly applicable to problems in which cost or other considerations make overall accuracy an inadequate or inefficient guide for solving the problem.

BRIEF DESCRIPTION OF THE DRAWINGS

FIG. 2 is a representation of a data structure used with an embodiment of the present invention.

FIG. 3 is a representation of relationships between predictions and outcomes, as used in an embodiment of the present invention.

FIG. 5 is a representation of a data structure used with an embodiment of the present invention.

FIG. 7 is a representation of a data structure used with an embodiment of the present invention.

DETAILED DESCRIPTION OF THE PREFERRED EMBODIMENTS

Figure 1:
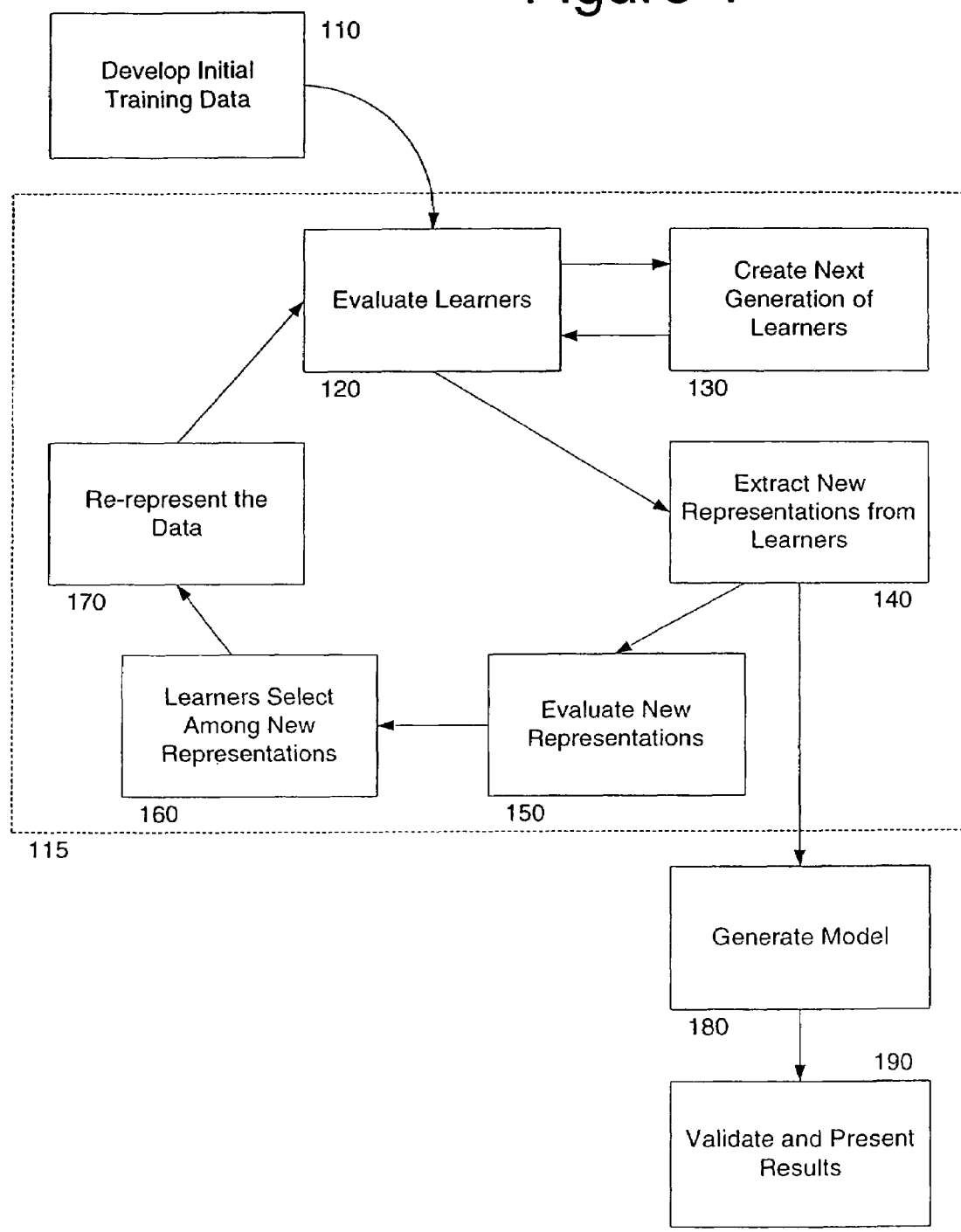
FIG. 1 is a block diagram illustrating an embodiment of the present invention.

FIG. 1 illustrates in block form a method for solving problems using machine learning techniques according to the present invention. In block 110, a set of training data is developed, for application to a machine learning system. That data is applied to a machine learning process, such as a co-evolution process, in block 115 (containing blocks 120, 130, 140, 150, 160, and 170). As part of the machine learning process, the data is applied to a set of learners in block 120, as is well known in the art. Preferably, the set of learners includes learners from more than one machine learning method, and there is more than one learner for some or all of the machine learning methods. For example, the system may use one or more of the following machine learning methods: neural networks, Bayesian analysis, decision trees (such as the See5 decision tree induction system), genetic algorithms, correlation, and regression. Of these, decision trees and neural networks have been found to be particularly useful in many situations. In particular, these two methods tend to provide especially good results in later cycles. In a preferred embodiment, multiple versions of each machine learning method are used. Each learner operates on the training data, according to a set of parameters. The learners for a particular method may use different inputs, different representations of the data, and/or different parameters.

In block 130, the results of the machine learning methods are used to generate a new generation of learners, as is also well known in the art. The steps in blocks 120 and 130 can be repeated multiple times before moving onto block 140, where new representations or combinations of the features or data are extracted from the learners. These new representations are based on the rules developed by the learners. They are evaluated in block 150 according to a fitness function for the rules from which the representations were extracted. This allows the new learners to select among the new representations in block 160. In order to evaluate the new representations, a feature relevance measure is applied. Preferably, the feature relevance measure uses identification (prediction), classification (into discrete classes), and regression (for continuous values), such as is discussed in M. Robnik-Sikonja and I. Kononenko, "An Adaptation of Relief for attribute estimation in regression." Machine Learning: Proceedings of the Fourteenth International Conference (ICML 1997), ed., Dough Fisher, pp. 296-304, Morgan Kaufmann Publishers, 1997, which is incorporated herein by reference.

The data is then re-represented according to the new representations, in block 170, for use in the next cycle. The cycle then repeats, with the new representations of the data being evaluated by the new learners in block 120. Preferably, the system runs until a given number of cycles have run, a set time period has elapsed, or a desired accuracy level is obtained. After completing these cycles, the results lead to the generation of a model or rule set that provides a proposed solution to the problem, as shown in block 180. In one embodiment, the system runs for approximately 10-20 cycles within block 115.

After the machine learning process within block 115, the results are validated, as shown in block 190, and described below. Preferably, the entire process or simulation is run numerous times, with different sets of initial data and/or different parameters. Different runs will tend to produce different output results, which may provide different levels of accuracy and rule sets with a greater or lesser level of complexity.

Figure 8:
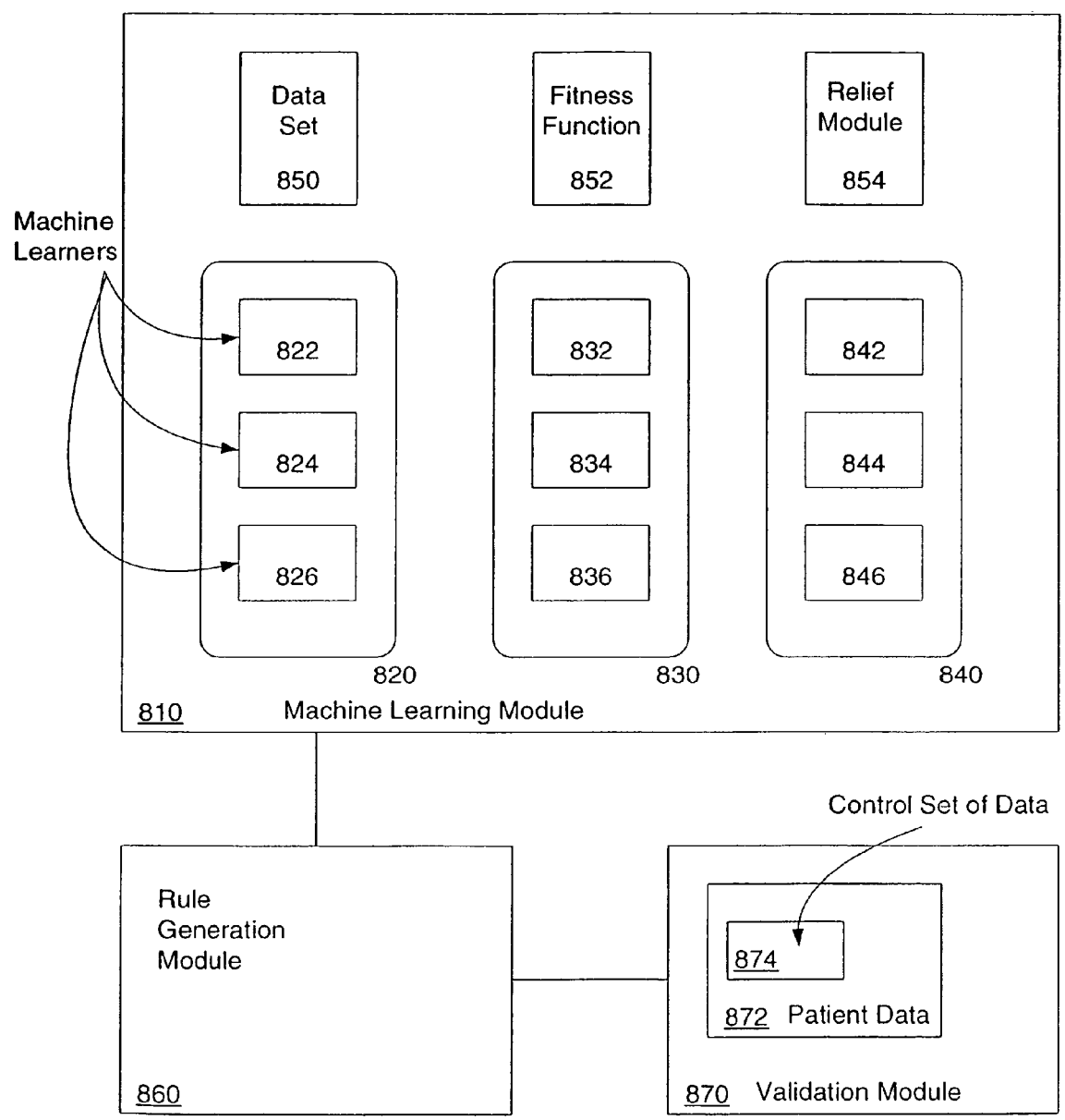
FIG. 8 is a block diagram illustrating an embodiment of the present invention.

In a preferred embodiment, the steps in blocks 120, 130, 140, 150, 160, and 170 are carried out using a modification of the CoEv software, written in the Lisp programming language, and running on a Silicon Graphics Origin 2000 computer. Preferably, the relief utility in the software and used in block 160 is modified in a manner like that described in the Robnik-Sikonja and Kononenko article, and a new fitness function is applied (as described below). However, other machine learning systems, written in the same or other computer languages, using one or more machine learning techniques, and using or not using a co-evolution technique, could be used. Also, other computer hardware and processors could be used. As shown in FIG. 8, machine learning module 810 includes sets (820, 830, and 840) of machine learners, where each set represents a group of learners using the same machine learning method. Thus, in the example in FIG. 8, machine learners 822, 824, and 826 use decision trees, machine learners 832, 834, and 836 use neural networks, and machine learners 842, 844, and 846 use genetic algorithms. Machine learning system 810 also includes data set 850, fitness function 852, and relief module 854.

In order to develop the training data, an initial set of data is obtained. For example, to predict the patients that will have significant neonatal problems, or to predict which members of a population will need transplants or develop serious disabilities, an initial set of patient data may be obtained from an insurance company or other source. Preferably, this data is available from a database of patient information. Any potentially relevant information is extracted and coded into a set of features for use by the machine learning system.

For example, to predict patients that will have significant neonatal problems, records for mothers and their newborns may be obtained for a given period of births. The mothers can then be divided into catastrophic and non-catastrophic cases, depending on whether they had medical claims exceeding a threshold, such as $20,000. Similarly, the newborns can be divided into catastrophic and non-catastrophic cases, depending on whether they had medical claims exceeding a threshold, which could be the same or different from the threshold for the mothers' medical costs. Also, cases could be classified as catastrophic or non-catastrophic based on whether the combined costs for the mother and newborn exceed a threshold, based on whether the costs for the mother and for the newborn each exceed thresholds, or based on other combinations or factors. The data is then coded into a set of possibly relevant features.

Preferably, in the medical context, the data will include claims data (that is, data pertaining to each visit or procedure performed), the cost for each visit or procedure performed, the reasons for each visit or procedure, and demographic information about each patient and the patient's community. Preferably, a filtering process is used so that data not considered relevant to the prediction is omitted. The preparation of the data can be performed using a manual process, an automated process that might use a feature relevance metric such as the Relief algorithm or some other algorithm, or a combination of manual and automated steps.

In a preferred embodiment, data records 210 (FIG. 2) are created with the multiple initial data categories, or features, based on census data and information relating to a medical coding system, such as the ICD9 hospital coding system. For example for the neonatal problems prediction, as shown in FIG. 2, the following categories have been used: AGE 220 (the mother's age, divided into discrete age categories), AGEX 221 (the mother's age, as a continuous variable), AMTPAIDYR1 222 (the total claims in year 1, in dollars), AMTPAIDYR2 223 (the total claims in year 2, in dollars), ANTENSCREEN 224 (the number of antenatal screenings performed), ANTENSCREENB 225 (the number of antenatal screenings performed 30-270 days before birth), ANTEPARTUM 226 (the number of other antepartum services performed), ANTEPARTUMB 227 (the number of other antepartum services performed 30-270 days before birth), BIRTHTYPE 228 (the type of birth—single or multiple), BLACK 229 (the proportion of African Americans in the patient's 5-digit zip code), CCOMPLEX 230 (the number of neonatal complications), COST20MN 231 (whether the total costs for the mother and the newborn exceed the threshold), COST20N 232 (whether the total costs for the newborn exceed the threshold), CPT5900 233 (whether amniocentesis was performed on the mother), CPT5900B 234 (whether amniocentesis was performed on the mother 30-270 days before birth), CPT5942X 235 (whether the mother had fewer than 4 antepartum care visits), CPT5942XB 236 (whether the mother had fewer than 4 antepartum care visits 30-270 days before birth), DELIVERTYPE 237 (the delivery type—vaginal or cesarean), FERDRUG 238 (the number of fertility drug prescriptions used), HISPANIC 239 (the proportion of Hispanics in the patient's 5-digit zip code), HRPVISITS 240 (the number of high-risk prenatal visits, divided into categories), HRPVISITSX 241 (the number of high-risk prenatal visits, as a continuous variable), HRPVISITSB 242 (the number of high-risk prenatal visits 30-270 days before birth), INCOME 243 (the median household income in the patient's 5-digit zip code), MCOMP 244 (the number of maternal complications 30-270 days before birth), MCOMPLEX 245 (the number of maternal complications), MCOMPLEX1 246 (the number of maternal complications during the first trimester), MCOMPLEX2 247 (the number of maternal complications during the second trimester), MCOMPUNI 248 (the number of unique maternal complications 30-270 days before birth), NPVISITS 249 (the number of normal prenatal visits, divided into categories), NPVISITSX 250 (the number of normal prenatal visits, as a continuous variable), NPVISITSXB 251 (the number of normal prenatal visits 30-270 days before birth), PMANAGE 252 (whether there was assisted reproductive management), PMANAGEB 253 (whether there was assisted reproductive management 30-270 days before birth), WHITE 254 (the proportion of whites in the patient's 5-digit zip code), ZIP 255 (the first 3 digits of the patient's zip code), and ZIPX 256 (the patient's 5-digit zip code). Of course, other data and/or only some of this data could be used as appropriate for a given problem. Generally, the data can be represented as continuous or as discrete variables.

It has been found that using the patient's 5-digit zip code can lead to improved uses of census data, in developing the rules. For example, with the patient's 5-digit zip code, statistical information such as median income, the racial makeup of the area covered by that zip code, and other data that helps to predict the result can be applied more productively than if only the first three digits of the patient's zip code were used.

This data forms the initial set of training data for the machine learning methods. The data can be considered to include a plurality of feature (or input) variables and an output variable, such as the cost. Preferably, where the outcome being predicted is rare (such as with catastrophic neonatal results), the resampled training data is based on taking only a portion of the total patient data for the more common outcome. It has been found that using the CoEv software, the machine learning system does not easily obtain useful rules for rare outcomes where all of the training data is used. With medical outcomes, for example, the likelihood of the "catastrophic" result is typically less than 1 in 30. In a preferred embodiment, the ratio in the resampled training data (which is a subset of the initial set of training data) of patients with the less common outcome (such as the catastrophic neonatal results) to patients with the more common outcome is approximately 1 to 2, as described further below. However, other ratios, whether higher or lower, could be used for the resampled training data as appropriate. In one embodiment, all of the data representing patients with the less common outcome is used, and a sample of patients with the more common outcome is used. Alternatively, only a sample of the patients with the less common outcome can be used for the resampled training data.

Figure 9:
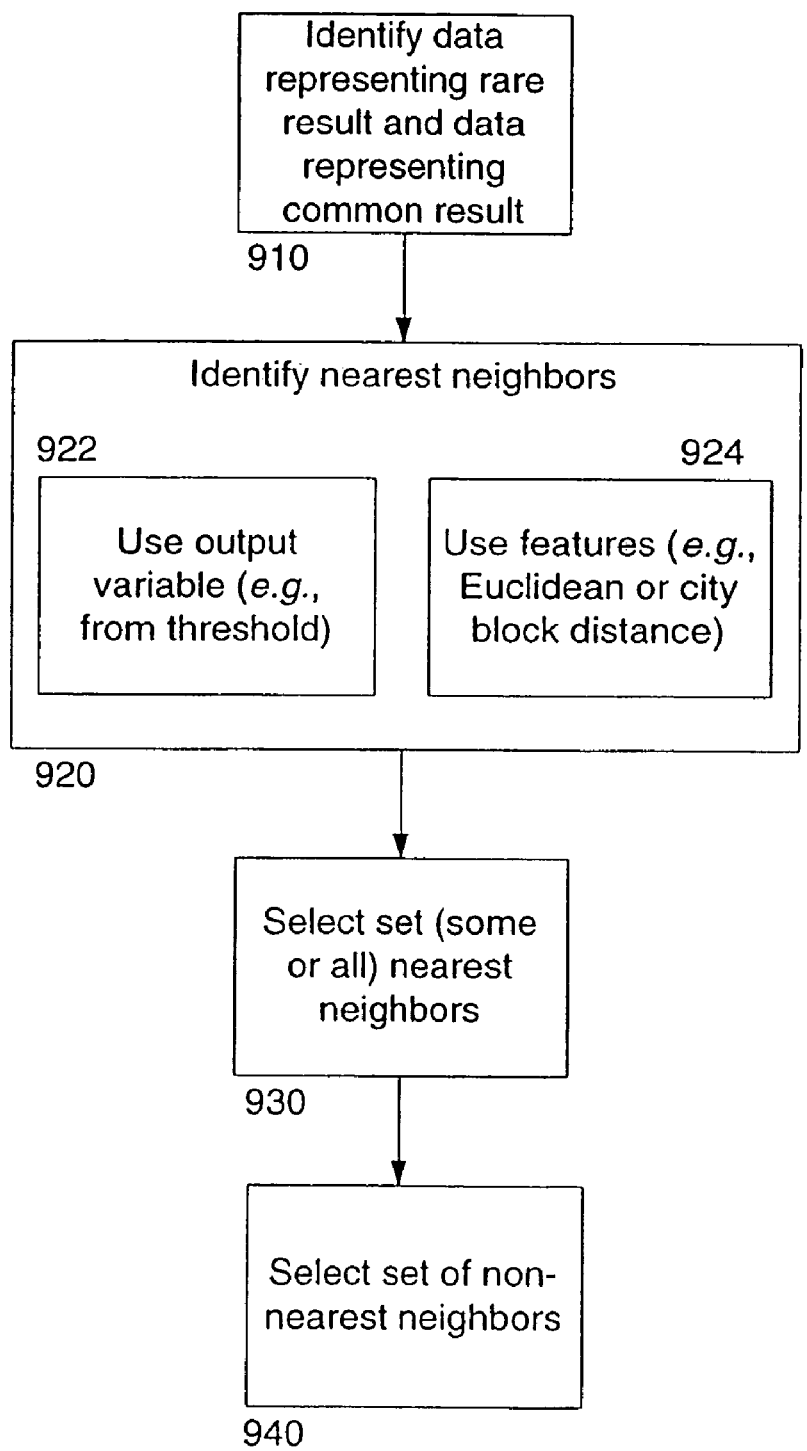
FIG. 9 is a block diagram illustrating an embodiment of the present invention.

Preferably, as shown in FIG. 9, the initial set of training data is divided into data representing the rare result and data representing the common result (step 910). From the data representing the common result, the "nearest neighbors" to the rare result are identified (step 920). Then, some (or all) of the nearest neighbors (step 930) and some of the other records representing the common result (step 940, which need not be after step 930) are selected for use in the resampled training data. In a preferred embodiment, the resampled training data includes approximately equal numbers of rare results, nearest neighbors, and others, yielding an overall ratio of data for the less common outcome to data for the more common outcome (including nearest neighbors) of approximately 1 to 2.

The nearest neighbors can be identified in various ways. In one embodiment, the nearest neighbors are identified based on the output variable (shown as step 922). For example, if a cost threshold is used to determine whether a particular outcome did or did not occur (for example, if the outcome is "high medical costs," based on whether the costs [output] variable exceeds $20,000), then the nearest neighbors can be determined based on the costs for the records in the low medical costs group (the more common outcome). Those identified as nearest neighbors may be those closest to the threshold, such as the 500 results within the low cost group with the highest costs. Or, the nearest neighbors may be determined based on the threshold. For example, the nearest neighbors could be based on a percentage (such as 75%) of the threshold used to determine membership in the high costs group. In either case, either all of the identified nearest neighbors can be selected for the resampled training data or just a subset of the identified nearest neighbors can be selected for the resampled training data. It should be understood that the "nearest neighbors" could exclude those within a certain distance of the threshold, if desired. For example, the nearest neighbors could be selected from those with costs greater than 75% of the threshold but less than 98% of the threshold.

In an alternative embodiment, the nearest neighbors are determined based on the features rather than the results (shown as alternative step 924). For example, if the result is based on total costs and the features considered include number of medical visits, age, income, and number of complications, then the nearest neighbors can be identified based on a distance measure of the features of those records in the common group from the features of those records in the rare group. Common distance measures include those based on Euclidean distance or city block distance, although any measure could be used. The Euclidean distance, in a preferred embodiment, for a particular record within the common group, is determined by calculating with respect to each record in the rare group, the square root of the sum of the squares of the differences between the respective values of each factor. The city block distance, in a preferred embodiment, for a particular record within the common group, is determined by calculating with respect to each record in the rare group, the number of factors that have differences. As with identifying the nearest neighbors from the results, either the closest neighbors can be selected, or a subset of the identified nearest neighbors can be selected as the nearest neighbors to include in the resampled training data.

For those records within the more common group that are not nearest neighbors, a subset is selected for inclusion in the resampled training data. Preferably, when not selecting all of one of the groups of data (typically, the nearest neighbors or the other common results), a random sampling is used to determine which records are included in the resampled training data.

In creating the next generation of learners, in block 130, parameter values from the learners are copied and varied. Preferably, those learners with the highest fitness functions are modified by mixing parameters from other learning agents that use either the same or a different machine learning method, using crossover and mutation processes. In a preferred embodiment, the parameters for those learners that have a higher fitness function will be used more often. In one embodiment, this is performed statistically, with the frequency of using parameters from each learner based on the relative score for that learner compared with the scores of the other learners. Where desired, the scores can also be weighted according to the particular machine learning method or other factors.

The typical fitness function uses an accuracy measure based on the number of true positive results plus the number of true negative results, all divided by the total number of outcomes (the sum of true positives, true negatives, false positives, and false negatives). The fitness function may also consider the time required to obtain those results. As shown in FIG. 3, the predicted outcome versus the actual outcome can be represented in a two-by-two table 310, with a prediction of a "positive" outcome or result in the top row and a prediction of a "negative" outcome in the bottom row, where a "positive" outcome signifies that the result in question occurs and a "negative" outcome signifies that the result in question does not occur. For example, if the question is whether there will be high neonatal costs or serious complications, a "positive" outcome represents the occurrence of high costs or serious complications, and a negative outcome represents that the high costs or serious complications were not incurred. The left-hand column of table 310 indicates an actual positive outcome and the right-hand column indicates an actual negative outcome. Accordingly, top left-hand box 320 represents a true positive result (that is, a correct prediction of a positive outcome), top right-hand box 322 represents a false positive result (that is, an incorrect prediction of a positive outcome), lower left-hand box 324 represents a false negative result (that is, an incorrect prediction of a negative outcome), and lower right-hand box 326 represents a true negative result (that is, a correct prediction of a negative outcome).

In predicting outcomes, the ratio of true negatives to the total number of false outcomes (that is, the number of results in box 326 divided by the number of results in boxes 322 and 326) provides a measure of the specificity of the prediction. The ratio of true positives to the total number of true outcomes (that is, the number of results in box 320 divided by the number of results in boxes 320 and 324) provides a measure of the sensitivity of the prediction. The positive predictive value of the prediction is the ratio of true positives to total predictions of a positive result (that is, the number of results in box 320 divided by the number of results in boxes 320 and 322), and the negative predictive value is the ratio of true negatives to total predictions of a negative result (that is, the number of results in box 326 divided by the number of results in boxes 324 and 326).

While the overall accuracy can be an appropriate goal in some situations, when predicting serious medical outcomes it has been found that sensitivity and positive predictive value tend to be more useful. That is, it is desirable to obtain a high sensitivity, so that opportunities to provide preventive care are not missed, and it is desirable to obtain a high positive predictive value so that expensive resources are not used on patients who will not need extra preventive care measures. Because patients with negative outcomes (in the sense that the serious problem does not occur) do not need the extra preventive care, measures of specificity and negative predictive value tend to be less important. However, in other applications these measures may be more important than overall accuracy, sensitivity, or positive predictive value. More generally, desired results may be based on a weighted combination of the sensitivity and the positive predictive value, or other weighted combinations of these parameters. Or, the desired results may be based on some other ratio of weighted combinations of the numbers of true positives, true negatives, false positives, and false negatives.

Accordingly, in a preferred embodiment, the fitness function is based on one or more parameters other than accuracy, such as the sensitivity and positive predictive value of the predictions. In one embodiment, these two values are weighted equally, using a sum of the sensitivity and positive predictive value. Alternatively, one of these values could be weighted more heavily. In another embodiment, the fitness function is based on the sensitivity, the positive predictive value, and the correlation coefficient, where the correlation coefficient is based on the total number of true positives and true negatives. As desired, the fitness function can be based on any ratio (or other relationship) between (a) a weighted combination of true positives and/or true negatives, and (b) a weighted combination of true positives, true negatives, false positives, and false negatives, where some of these may not be included (that is, receive a weighting of 0). The fitness function also can be based on any other appropriate relationship. Preferably, the user of the system is able to define and modify the fitness function.

The new representations extracted in block 140 correspond to combinations of features from the existing data that were used in rules generated by the learners. These new features may be, for example, Boolean expressions (such as "age is greater than 35" AND lives in [specified] zip code), mathematical combinations of features (such as feature 1 multiplied by feature 2, or feature 3 plus feature 4), transformations of features, or combinations of these.

In evaluating the new representations (at block 150), the system preferably considers both the importance of the feature to the rule (that is, a measure of the extent to which, when the feature existed in an example, the rule accurately predicted the result) and the fitness of the rule from which the representation was extracted as defined by the fitness function or by a variation of the fitness function specialized for compound features. The variation of the fitness function could involve combining it with the relevance function, with measures of feature quality such as the size of the compound feature, or other factors.

In selecting among the new representations (at block 160), the system preferably selects representations for each learner without regard to whether a representation was developed from the same machine learning method as the method for which the selection is being made or from another machine learning method. Alternatively, the new representations could be selected only for particular learners. For example, for a specific learner, the system could select only representations generated by learners of a different type, or only representations generated by learners using particular methods.

Figure 4:
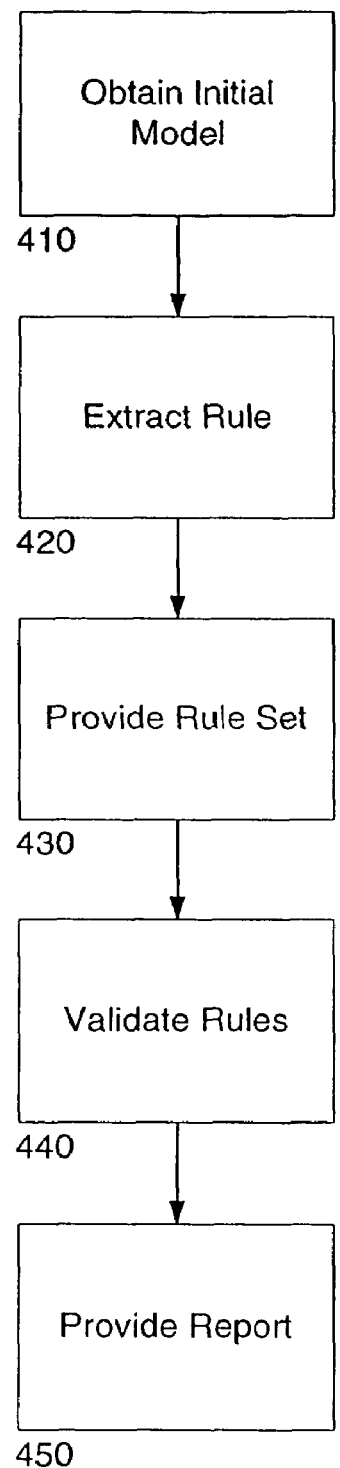
FIG. 4 is a block diagram illustrating an embodiment of the present invention.

After a specified number of cycles or time period using the machine learning system (represented by block 115), or when the results based on the fitness function are sufficiently high, a model is obtained (block 180). As shown in FIG. 4, the model goes through several steps. An initial model (at step 410), obtained from the machine learning system, is applied to a rule extraction process (step 420), which converts the raw rule data into a pseudo-English rule set (step 430). Where multiple rules result, they are preferably applied in a cascading manner. That is, if rule 1 is true, then the predicted outcome is a positive result; if rule 1 is false, rule 2 is examined; if rule 2 is true, then the predicted outcome is a positive result; and so forth until a true value is determined for a rule or all of the rules have been examined. If all of the rules are false, the predicted outcome is a negative result. However, other mechanisms for evaluating the rules can be employed, and differing confidence levels for different rules can be used. Rule extraction process 420 is part of the rule generation module 860, shown in FIG. 8. Rule generation module 860 preferably is written in the C or the C++ programming languages and runs on a Silicon Graphics Origin 2000 computer (preferably, the same computer that runs the modified CoEv software). However, other programming languages and/or computers could be used.

An example rule set 510 is shown in FIG. 5. In this case, the rule set contains two rules 515 (indicated by rules 515*a* and 515*b*), each specifying a value for feature 520 (indicated by feature 520*a* and 520*b*), a result 525 (indicated by items 525*a* and 525*b*), and a confidence level 530 (indicated by items 530*a* and 530*b*). Where the feature 520 is not a basic feature initially input into the machine learning system, rule set 510 preferably also includes a description 540 of the feature. In this case, feature 256601 (item 520*a* and 520*b*) is described at item 540.

In order to validate the rules, the rules are applied to a validation process (step 440 in FIG. 4), which validates the rules and preferably also provides a report, at step 450.

Figure 6:
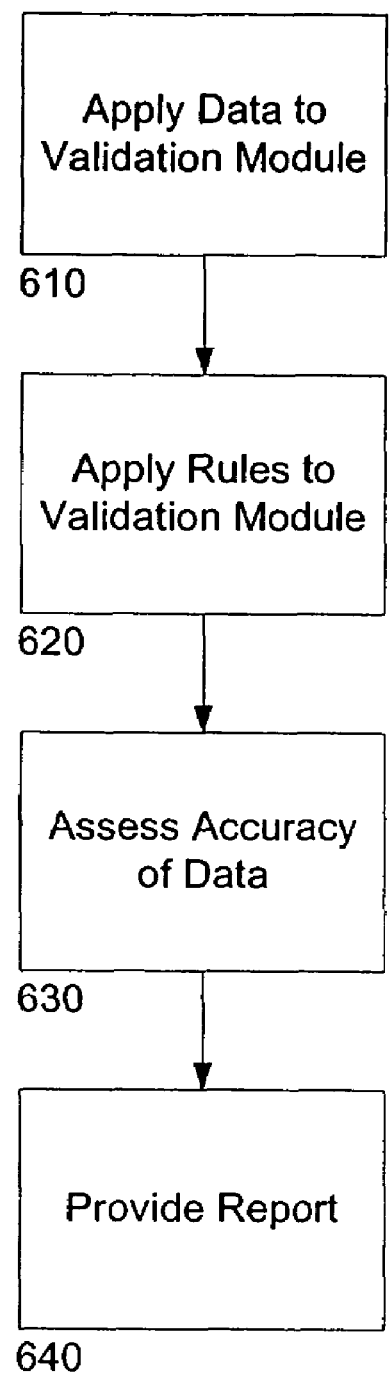
FIG. 6 is a block diagram illustrating an embodiment of the present invention.

Where, as described in the above example, not all of the available patient data is used in generating the rules, the unused data can be used to validate the results. For the validation, all of the patient data 872 (in FIG. 8) is applied to a validation module 870 (step 610 in FIG. 6), along with the rules (step 620). At step 630, validation module 870 assesses the accuracy of the data. Preferably, validation module 870 uses a database program, such as Microsoft Access, and runs on a personal computer, in order to apply the rules to the data and assess the accuracy. Alternatively, other database programs can be used, running on a personal computer or on the same computer as is running the rest of the system. In a preferred embodiment, the accuracy is assessed by determining, for both the initial or control set of data 874 and the complete set of data 872, the sensitivity, specificity, positive predictive value, and negative predictive value of the rules.

Optionally, the results of the validation step can be used to modify the rules directly, or as feedback for a new run of the rule generation process. For example, the number of learners of certain types, the parameters used by the learners, or the data considered may be modified in light of the results.

The results can then be turned into a report, which can be stored, displayed, and/or printed (step 640, corresponding to step 450 in FIG. 4).

Alternatively, the validation and report generation steps (or just the report generation step) can be performed after completing an entire series of simulations. This permits the report to compare the results for different simulations.

In a preferred embodiment, the report 710 (FIG. 7) identifies the simulations that provided the best results (items 720). For each reported simulation, the report provides general information about the test, including the criteria used (such as, total neonatal costs exceed a threshold or total mother and neonatal costs exceed a threshold) (item 722), the number of positive outcomes in the data set (item 724), the number of negative outcomes in the data set (item 726), the number of negative outcomes in the control or test set (item 728), and the selection criteria used to select the negative outcomes for the resampled training data (item 730). For example, the criteria could be that a 3 to 1 ratio of negative to positive outcomes was used, with the negative outcomes chosen randomly from the set of all negative outcomes.

The report preferably also identifies the initial features used for the simulation (item 732) and the output of the simulation (item 734), in terms of the number of rules generated (item 736) and a measure of the complexity of the model (item 738).

In addition, the report preferably provides accuracy indications for both the resampled training data (item 740) and the validation (using all the data) (item 750). The accuracy indications include the sensitivity, the specificity, the positive predictive value, and the negative predictive value for the model and the particular data set.

While there have been shown and described examples of the present invention, it will be readily apparent to those skilled in the art that various changes and modifications may be made therein without departing from the scope of the invention as defined by the following claims. For example, the system could be used to predict among more than two outcomes or where the input variables are selected directly from a database, or where compound input features are generated by different methods, or where the learners are modified to pursue fitness functions by different methods, or where the fitness functions optimize different aspects of the predictive models. Accordingly, the invention is limited only by the following claims and equivalents thereto.

What is claimed is:

1. A computer-executable method for using machine learning to predict an outcome associated with a medical condition, the method comprising:

receiving training data including a plurality of records associating feature variables with outcome variables corresponding to at least one medical condition, wherein the training data comprises a first data set associated with a first outcome and comprises a second data set associated with a second outcome substantially less likely than the first outcome;

identifying within the first data set a third data set that consists essentially of nearby neighbors to the second data set;

using a plurality of software-based, computer-executable machine learners to develop from the first, second and third data sets at least one set of computer-executable rules usable to predict the first outcome or the second outcome;

processing a portion of the training data with a machine learning system, wherein the training data portion is recorded in a computer-readable medium, and wherein said processing includes:
selecting a first subset of the first data set,
selecting a second subset of the second data set, and
selecting a third subset of the third data set; and wherein said using the plurality of software-based, computer-executable machine learners comprises developing from the first, second and third subsets the at least one set of computer-executable rules.

2. The method of claim 1, wherein selecting the second subset comprises selecting substantially all the data of the second set.

3. The method of claim 1, wherein the first subset, second subset and third subset are substantially the same size.

4. A computer-executable method for using machine learning to predict an outcome associated with a medical condition, the method comprising:

receiving training data including a plurality of records associating feature variables with outcome variables corresponding to at least one medical condition, wherein the training data comprises a first data set associated with a first outcome and comprises a second data set associated with a second outcome substantially less likely than the first outcome;

identifying within the first data set a third data set that consists essentially of nearby neighbors to the second data set;

using a plurality of software-based, computer-executable machine learners to develop from the first, second and third data sets at least one set of computer-executable rules usable to predict the first outcome or the second outcome; and identifying the nearby neighbors in the first data set based on a proximity of data in the first data set to the second outcome.

5. A computer-executable method for using machine learning to predict an outcome associated with a medical condition, the method comprising:

receiving training data including a plurality of records associating feature variables with outcome variables corresponding to at least one medical condition, wherein the training data comprises a first data set associated with a first outcome and comprises a second data set associated with a second outcome substantially less likely than the first outcome;

identifying within the first data set a third data set that consists essentially of nearby neighbors to the second data set;

using a plurality of software-based, computer-executable machine learners to develop from the first, second and third data sets at least one set of computer-executable rules usable to predict the first outcome or the second outcome; and identifying the nearby neighbors in the first data set based on a proximity of data in the first data set to the feature variables of data in the second data set.

6. A computer-executable method for using machine learning to predict an outcome associated with a medical condition, the method comprising:

receiving training data including a plurality of records associating feature variables with outcome variables corresponding to at least one medical condition, wherein the training data comprises a first data set associated with a first outcome and comprises a second data set associated with a second outcome substantially less likely than the first outcome;

identifying within the first data set a third data set that consists essentially of nearby neighbors to the second data set;

using a plurality of software-based, computer-executable machine learners to develop from the first, second and third data sets at least one set of computer-executable rules usable to predict the first outcome or the second outcome; and validating the at least one set of rules using substantially all the training data.

7. The method of claim 6, wherein said validating includes obtaining at least one accuracy measure for the at least one set of rules.

8. The method of claim 7, wherein obtaining the at least one accuracy measure includes obtaining at least one of a positive predictive value and a sensitivity of the at least one set of rules.

9. A computer-executable method for using machine learning to predict an outcome associated with a medical condition, the method comprising:

receiving training data including a plurality of records associating feature variables with outcome variables corresponding to at least one medical condition, wherein the training data comprises a first data set associated with a first outcome and comprises a second data set associated with a second outcome substantially less likely than the first outcome;

identifying within the first data set a third data set that consists essentially of nearby neighbors to the second data set; and using a plurality of software-based, computer-executable machine learners to develop from the first, second and third data sets at least one set of computer-executable rules usable to predict the first outcome or the second outcome, wherein using the plurality of software-based, computer-executable machine learners further includes developing a set of interim rules using the plurality of software-based, computer-executable machine learners, evaluating the set of interim rules, and developing a revised set of interim rules using the results of the evaluating act.

10. The method of claim 9, wherein evaluating the set of interim rules includes applying a user-selectable fitness function.

11. The method of claim 9, wherein evaluating the set of interim rules includes applying a fitness function based on at least one of a sensitivity, a positive predictive value, and a correlation coefficient of the interim rules.

12. A system for using machine learning to predict an outcome associated with a medical condition, the system comprising:

medical data including a plurality of records associating feature variables with outcome variables, wherein the medical data comprises a first data set associated with a first outcome and comprises a second data set associated with a second outcome substantially less likely than the first outcome, and wherein the feature variables include demographic data;

a processing module configured to identify within the first data set a third data set that consists essentially of nearby neighbors to the second data set; and a plurality of machine learners configured to develop from the first, second and third data sets at least one set of computer-executable rules usable to predict the first outcome or the second outcome.

13. The system of claim 12, wherein the processing module is further configured to select a first subset of the first data set, select a second subset of the second data set, and select a third subset of the third data set, and wherein said plurality of machine learners is configured to develop from the first, second and third subsets the at least one set of computer-executable rules.

14. The system of claim 12, further comprising a computer readable medium configured to store at least a portion of the medical data.

15. The system of claim 12, wherein the first outcome is associated with a first range of medical costs less than a cost threshold, and wherein the second outcome is associated with a second range of medical costs at least as great as the cost threshold.

16. The system of claim 12, wherein the first outcome is at least thirty times more likely than the second outcome.

17. A computer system for using machine learning to predict an outcome associated with a medical condition, the computer system comprising:

means for storing training data including a plurality of records associating feature variables with outcome variables corresponding to at least one medical condition, wherein the training data comprises a first data set associated with a first outcome and comprises a second data set associated with a second outcome substantially less likely than the first outcome;

means for identifying within the first data set a third data set that consists essentially of nearby neighbors to the second data set;

means for developing from the first, second and third data sets at least one set of computer-executable rules usable to predict the first outcome or the second outcome; and means for processing a portion of the training data, wherein said means for processing is configured to select a first subset of the first data set, select a second subset of the second data set, and select a third subset of the third data set, and wherein said means for developing is configured to use the first, second and third subsets to develop the at least one set of computer-executable rules.

* * * * *